(12) United States Patent
Chang

(10) Patent No.: US 6,826,434 B1
(45) Date of Patent: Nov. 30, 2004

(54) COMPUTERIZED NUMERICAL CONTROL FOR A SERVOMECHANISM

(75) Inventor: Kuo-Wei Chang, Lexington, MA (US)

(73) Assignee: Soft Servo Systems, Inc., Waltham, MA (US)

( * ) Notice: Subject to any disclaimer, the term of this patent is extended or adjusted under 35 U.S.C. 154(b) by 0 days.

(21) Appl. No.: 09/344,433

(22) Filed: Jun. 25, 1999

Related U.S. Application Data

(60) Provisional application No. 60/094,834, filed on Jul. 31, 1998.

(51) Int. Cl.[7] .................. G05B 19/42; G05D 23/275
(52) U.S. Cl. .................... 700/86; 700/56; 700/169; 318/632
(58) Field of Search .................. 700/56, 169, 187, 700/193, 302, 86; 219/121.8, 121.74, 121.78; 318/632

(56) References Cited

U.S. PATENT DOCUMENTS

| | | | | |
|---|---|---|---|---|
| 4,262,336 A | * | 4/1981 | Pritchard | .................... 700/159 |
| 4,763,055 A | | 8/1988 | Daggett et al. | ............. 318/368 |
| 4,876,494 A | | 10/1989 | Daggett et al. | ........ 318/568.22 |
| 4,894,598 A | | 1/1990 | Daggett et al. | |
| 4,961,038 A | | 10/1990 | MacMinn | |
| 4,962,338 A | | 10/1990 | Daggett et al. | |
| 5,021,622 A | * | 6/1991 | Magara et al. | ........... 219/69.12 |
| 5,610,507 A | | 3/1997 | Brittan | |
| 5,625,264 A | * | 4/1997 | Yoon | .......................... 318/254 |
| 5,659,479 A | * | 8/1997 | Duley et al. | ................ 700/166 |
| 5,710,498 A | * | 1/1998 | Yutkowitz et al. | .......... 318/632 |
| 5,760,556 A | | 6/1998 | Hamilton, Jr. et al. | |
| 5,768,280 A | * | 6/1998 | Way | .......................... 370/486 |
| 5,918,514 A | * | 7/1999 | Crudgington et al. | ......... 82/129 |
| 6,034,547 A | * | 3/2000 | Pani et al. | ..................... 326/41 |

OTHER PUBLICATIONS

"Universal Stepper Motor Controller", Apr. 1, 1994, IBM Technical Disclosure Bulletin, vol. 37, Issue 4A, pp. 311–314.*

"PC–Based Control Goes Real–Time" by Dean J. Petrone and Michael D. Stackhouse, Timken Research, Apr. 1998–Control Engineering, pp. 54–64.

* cited by examiner

*Primary Examiner*—Leo Picard
*Assistant Examiner*—Sheela S. Rao
(74) *Attorney, Agent, or Firm*—Iandiorio & Teska

(57) ABSTRACT

A computerized numerical control system is provided for controlling a servomechanism under the direction of a general-purpose computer system. The system implements in software a PID controller for determining appropriate inputs to the servomechanism. The system further includes a Field Programmable Gate Array which is loadable with custom logic for remotely interfacing to the servomechanism.

37 Claims, 7 Drawing Sheets

COMPUTERIZED NUMERICAL CONTROL FOR A SERVOMECHANISM

RELATED APPLICATIONS

The present invention claims priority from Provisional Application No. 60/094,834 filed Jul. 31, 1998 and titled "Full Software Servoing for PC-based NC with Windows NT".

BACKGROUND OF THE INVENTION

The present invention relates generally to computerized control of a servomechanism and more particularly to computerized control of a servomechanism where an operational response to feedback from the servomechanism is derived by software executing in a general purpose computer system.

The increase in personal computer (PC) technology has offered manufacturers of factory automation and motion control applications an attractive substitute for custom control systems. However, early products used the PC merely as a human-machine interface, leaving the majority of the substantive tasks for controlling a device to dedicated hardware controllers. In more recent years, the PC-based systems used in such applications as controlling robots and or other servomechanisms have incorporated more real-time control into the PC itself. However tasks such as commutation and current loop control have been implemented on costly hardware platforms commonly known as servo amplifiers. Commutation and current loop control typically requires a fast computational capability that must be accomplished in real time; a task conventionally performed by Digital Signal Processing hardware. These hardware platforms are designed with a fixed set of control parameters, which are unlikely to be optimal under diverse operating conditions for control of different servomechanisms.

Furthermore, because a dedicated amplifier performs commutation, a different amplifier must be used for different motor types, including even those from the same or a different manufacturer.

It would thus be desirable and an advance in the state of the art to implement a control system for a servomechanism that allows for the real time calculation of commutation and current loop control parameters by a PC.

Furthermore, it would be desirable to provide a control system, implemented on a PC that is easily modified to adapt the control system to different servomechanisms.

SUMMARY OF THE INVENTION

The present invention advantageously provides for a computerized numerical control (CNC) system for controlling a servomechanism. With a unique software implementation of the control algorithm that is assisted by a hardware I/O control, real time computations needed for direct motion control can now be performed by a low cost PC. The present invention addresses the need to substitute a software implementation of certain servo functionality including commutation and current loop control that is conventionally implemented by dedicated hardware. The same PC used in a conventional PC-based system now takes on the new role of direct motion control, the principal function of a costly servo amplifier.

As a consequence, the cost of the system is substantially reduced since the requirement for customized hardware is reduced. The substitution of hardware by software also allows a high degree of flexibility, added system reliability, and new functionality that would otherwise be unattainable by a strictly hardware implementation.

In response to feedback derived from the operation of the servomechanism, a general-purpose computer system generates through software in real time, an input to the servomechanism to maintain the desired operation of the servomechanism. The general purpose computer system utilizes an operating system to control the execution of application tasks on the computer system, and the software controlling the operation of the servomechanism is intended to execute concurrently with these application tasks.

In one aspect of the invention, a PID control algorithm is implemented in software to generate an input to the servomechanism in response to feedback from the servomechanism. The PID algorithm includes gain coefficients associated with the respective proportional, integrating and differentiation factors of the algorithm. The gain coefficients are dynamically alterable on the computer system.

In a further aspect of the invention, a local controller is provided that interfaces to a communications bus for communicating with the software executing in the computer system.

In a yet further aspect of the invention, the local controller includes a Field programmable Gate Array (FPGA) for executing custom logic circuits to facilitate communication by generating an interrupt to invoke software for controlling the servomechanism.

In a still further aspect of the invention, the software for controlling the servomechanism includes a device driver for servicing interrupts generated by the local controller. The device drives a PID controller to provide a response to feedback obtained from the servomechanism.

The local controller advantageously includes a communication port for receiving feedback from the servomechanism and transmitting a response to the feedback. The communication port preferably interfaces to one or more fiber optic cables.

The computerized numerical control system of the present invention includes a remote controller that communicates with the local controller for interfacing to a Digital Power Stage to drive the operation of the servomechanism. The remote controller receives feedback from the operation of the servomechanism through the Digital Power Stage and communicates that feedback to the local controller. The remote controller includes a communication port to interface to a fiber optic cable for effecting the communication with the local controller.

In one aspect of the invention, the remote controller includes a Field Programmable Gate Array (FPGA) for executing customized logic to adapt the remote controller to the particular servomechanism that is controlled. The remote controller is loaded with the customized logic from the general-purpose computer system via the local controller and the fiber optic cable. The remote controller includes a generator to generate a Pulse Width Modulated (PWM) signal to provide an input to the Digital Power In one aspect of the invention, the servomechanism controlled by the computerized numerical controlled system is embodied as a synchronous AC motor.

BRIEF DESCRIPTION OF THE DRAWINGS

The present invention is described in relation to the accompanying figures in which the reference numbers for like elements are preserved throughout the figures.

DETAILED DESCRIPTION OF AN ILLUSTRATIVE EMBODIMENT

Figure 1:
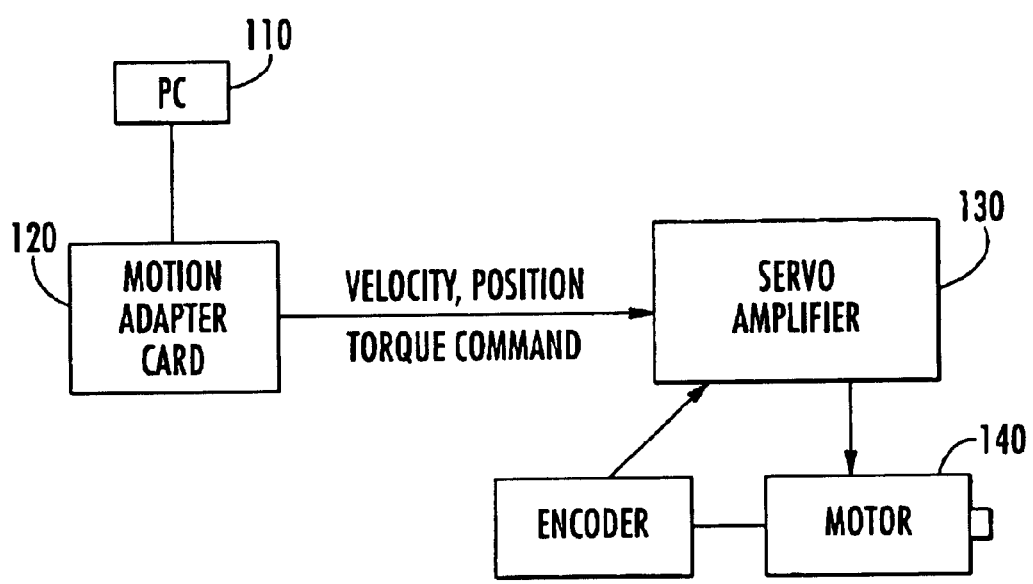
FIG. 1 is a schematic drawing of a prior art control system for controlling a servomechanism.

FIG. 1 shows a schematic of a conventional control system using a Personal Computer (PC) 110 for interfacing to a servomechanism embodied as a motor 140. The PC 110 does not perform calculations for commutation or current loop control of the motor 140, but rather is primarily used for providing a human-machine interface for the control system. A motion adapter card 120 is connected to the PC 110 but has customized hardware for determining velocity, torque and position commands to be sent to a servo amplifier 130. The servo amplifier 130 is unique to the type of motor controlled by the control system and provides commutation and a current loop response to the motor 140. Consequently, the motion adapter card 120 must be implemented specific to the servo amplifier 130 and motor 140. Substituting a different motor, having different motor characteristics, requires a physical change in the motion adapter card 120 if the card does not support the new motor type. There is no capability to dynamically provide the new functionality.

Figure 2:
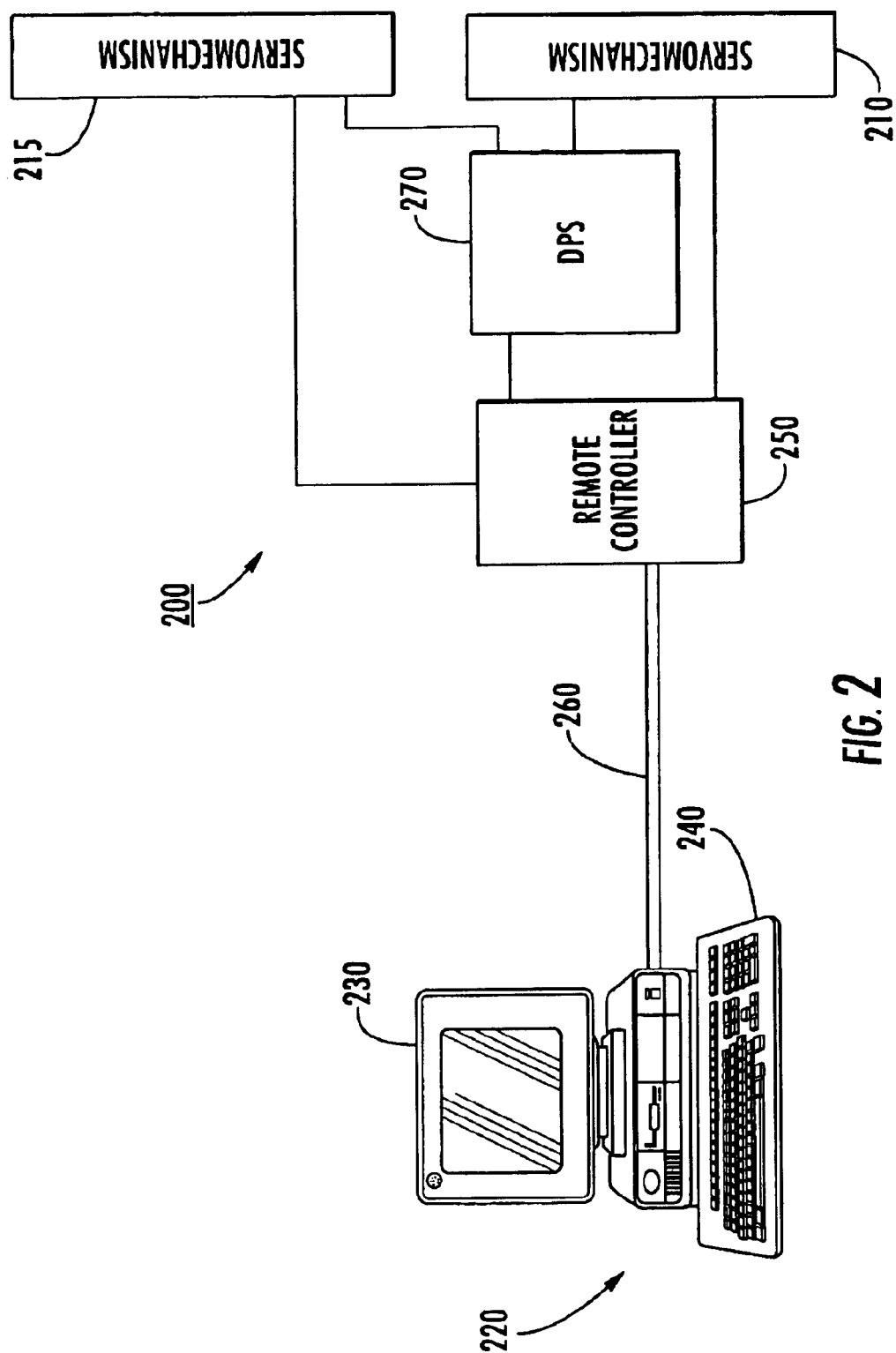
FIG. 2 is a schematic drawing of a computerized numerical control system for controlling a servo mechanism according to one embodiment of the present invention.

Referring now to FIG. 2 there is shown a schematic depiction of a computerized numerical controller (CNC) 200 for operating and controlling servomechanisms 210 and 215. In FIG. 2, servomechanisms 210 and 215 are shown, but the invention is not limited to only controlling just two servomechanisms. CNC 200 may concurrently control multiple servomechanisms. In the following description, the operation of CNC 200 will be explained with reference to one servomechanism 210, but those of ordinary skill in the art will recognize that the description of the operation of servomechanism 210 is also applicable to the operation of other servomechanisms, such as servomechanism 215 that are controlled by CNC 200 and reference to the other servomechanisms is omitted only to avoid redundancy.

CNC 200 includes a general purpose computer system 220 having a central processing unit (CPU) for executing programmed computer instructions, a random access memory (RAM) for storing the computer instructions, and a non-volatile memory such as a hard disk for permanently storing data relating to the control of servomechanism 210. In the preferred embodiment computer system 220 is a personal computer system (PC), but those of ordinary skill in the art will recognize that other types of computer systems such as a mini-computer or engineering workstation are suitable for practicing the invention. A display monitor 230 is connected to the computer system 220 for displaying data resulting from the executed computer instructions. A keyboard 240 or other input device is also connected to computer system 220 for inputting information into computer system 220.

Computer system 220 is remotely connected to a remote controller 250 via a communications link 260 which is preferably an optical communications link having two channels for communicating data to and from computer system 220. One channel is used for transmitting data from computer system 220 to remote controller 250 and the other channel is used for receiving information from remote controller 250. Communications link 260 advantageously allows computer system 220 to be remotely positioned from servomechanism 210, thus providing an efficient interface for an operator to control multiple servomechanisms from a safe and secure distance. The operator need not be exposed to environmental hazards associated with the nearby operation of the servomechanism. One of ordinary skill in the art will recognize that the invention is not limited to merely an optical communication link, and that other communication links employing twisted pair wiring, coaxial cable, or any other media appropriate for data communication are suitable for practicing the invention.

Remote controller 250 includes a Field Programmable Gate Array (FPGA) to allow for customized control of servomechanism 210. The FPGA can be dynamically loaded with customized FPGA code by computer system 220 via communication link 260 to configure and control the interface to many different types of servomechanisms. Because the remote controller 250 can be customized, the CNC 200 of the present invention provides an architecture for a general servo controller that can be readily adapted to varying servomechanisms without changing the components of the CNC 200 system.

Remote controller 250 is coupled to Digital Power Supply 270 (DPS) which interfaces to servomechanism 210 for receiving feedback from servomechanism 210 regarding the operation of the servomechanism 210. The feedback that is received by DPS 270 from servomechanism 210 is sent to remote controller 250 for transmittal to computer system 220 over communications link 260. Remote controller 250 may also be coupled directly to servomechanism 210 for receiving direct feedback from servomechanism 210 and issuing commands to control the operation of servomechanism 210.

In controlling servomechanism 210 computer system 220 executes a computer program for analyzing and monitoring the received feedback from servomechanism 210 and generates commands to DPS 270 via communications link 260 and remote controller 250 to control the operation of servomechanism 210. DPS 270 may interface to and receive feedback from multiple servomechanisms. In the preferred embodiment be DPS 270 interfaces and receives feedback from four servomechanisms, but the invention is not limited to only four servomechanism interfaces.

In the above discussion with reference to FIG. 2, the present invention has been described in relation to a generic servomechanism 210. It has been noted that CNC 200 could advantageously control different types of servomechanisms due to the ability to dynamically load customized FPGA code into the r emote controller 250. The customized FPGA code could be adapted to the characteristics of a specific servomechanism. However, in the preferred embodiment of the invention, servo mechanism 210 is an AC synchronous motor with DPS 270 interfacing to the AC motor to control the drive current delivered to the motor. Remote controller 250 is loaded with customized FPGA code according to the specific model of AC motor employed, and thus can be tailored to the characteristics of the individual model of AC motor.

In the following discussion and for purposes of disclosure, the CNC 200 according to the present invention, will be described with reference to controlling an AC synchronous motor as the illustrated embodiment, but it is pointed out that the present invention is not merely limited to controlling merely a synchronous AC motor, but rather has general applicability to a broader class of servo devices.

Figure 3:
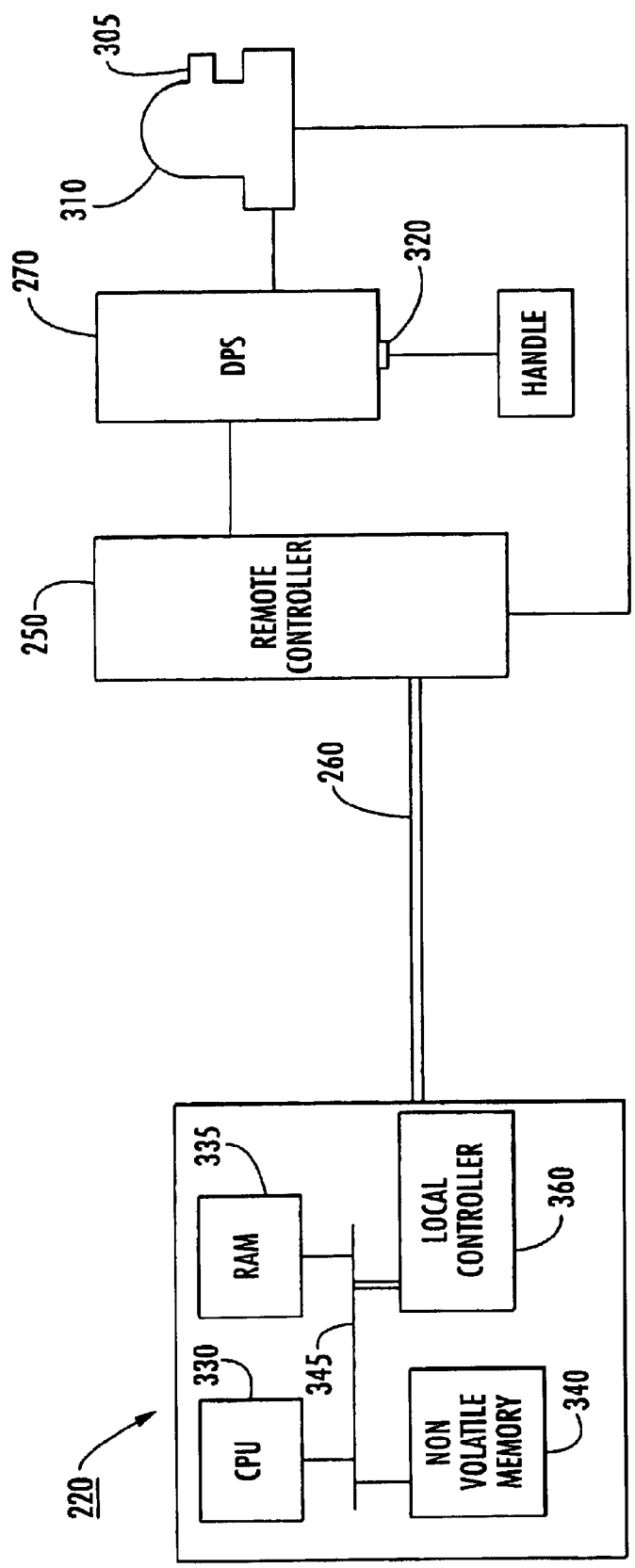
FIG. 3 is a schematic drawing of a computerized numerical control system for controlling a servomechanism according to one embodiment of the present invention in which the architecture of the computer system is shown.

FIG. 3 shows a schematic diagram of CNC 200, according to the present invention, for controlling the operation of a synchronous AC motor 310 emphasizing in detail the components of computer system 220. The synchronous AC motor 310 may be used in a number of different applications. One example of such an application in which a synchronous AC motor may be used is a tool cutting application. In this application, CNC 200 controls the operation of synchronous AC motor 310 to precisely control the tool cutting operation.

Synchronous AC motor 310 is operated by delivering power from a three-phase sinusoidal current source. By controlling the input three-phase current, CNC 200 controls the torque and rotation of a motor shaft 305.

As was previously discussed, DPS 270 interfaces to servomechanism 210, shown in FIG. 3 as synchronous motor 310. DPS 270 is adapted to receive feedback from motor 310 regarding the operation of the motor 310. Specifically, DPS 270 receives feedback of the three-phase AC current transmitted to the motor 310 by DPS 270. An encoder input from AC motor 310 provides to DPS 270 the position of the motor's shaft 305, and thus the angular velocity of the rotating shaft is determined by DPS 270. DPS 270 further provides an input port 320 for interfacing an external device to DPS 270 to manually control the operation of the motor by external means. For example, input port 320 may be connected to a switch mechanism for immediately stopping the operation of the motor 310 or may be connected to a rotatable handle for manually directing the desired speed of shaft rotation. DPS 270 accepts a pulse width modulated (PWM) input from remote controller 250, a digital input, to derive the magnitude of the output current signal that drives synchronous AC 310. The signal is in the form of digital pulses representative of a sinusoidal wave. As was previously discussed DPS 270 interfaces to multiple motors concurrently. In the preferred embodiment of the invention DPS 270 interfaces to four motors, but again the invention is not limited to only four motors.

CNC 200, according to the present invention, provides flexibility and ease in supporting different models of synchronous AC motors 310, due to the architecture employed by the CNC 200. Specifically, CNC 200 provides for a computer system 220 that executes computer software for monitoring and controlling the operation of motor 310 in real time. This software which is run in a standard operating system environment can be easily modified to support the characteristics of different motors. Thus CNC 200 avoids the necessity of specialized hardware or firmware for controlling specific motors.

Still referring to FIG. 3, computer system 220 is described further. Computer system 220 includes a central processing unit 330 (CPU) for executing programmed computer instructions implemented in software, a random access memory 335 (RAM) for storing the computer instructions, and a non-volatile memory 340 such as a hard disk for permanently storing data and computer software relating to the control of synchronous AC motor 310. In the preferred embodiment computer system 220 is a personal computer system (PC) employing a general purpose processor such as that manufactured by Intel of Santa Clara, Calif., 128 Megabytes of RAM, and a hard disk of at least 5 Megabytes, but those of ordinary skill in the art will recognize that other types of computer systems such as a mini-computer or engineering workstation are suitable for practicing the invention. Similarly, other PC configurations may be suitable for practicing the invention. A display monitor 230 is connected to the computer system 220 for displaying data resulting from the executed computer instructions. A keyboard 240 or other input device is also connected to computer system 220 for inputting information into computer system 220.

Computer system 220 includes a computer bus 345 to permit data exchange between CPU 330, RAM 335, and non-volatile memory 340. Computer system 220 further includes slots for connecting printed circuit boards (PCB) to the system. A PCB communicates with the other components of the system including the CPU 330, RAM 335, and non-volatile memory 340 through computer bus 345. In one embodiment of the invention computer bus 345 is an Industry Standard Architecture (ISA) computer bus, but the invention is not limited to only an ISA computer bus. Other computer busses such as the personal computer interface (PCI) bus, the Extended Industry Standard Architecture (EISA) bus, the VESA bus, or the VME bus, are considered to be within the scope of the invention. Those of ordinary skill in the art will recognize that any computer bus that facilitates communication between components of the computer system 220 will be suitable to practice the invention.

Computer system 220 is in the preferred embodiment a general-purpose computer system that executes computer program comprising custom developed software. These computer programs execute under the control of an operating system (OS) that is installed on computer system 220. The operating system (OS) is conventional. The OS provides services at the request of the computer programs. Typically, the OS is multi-tasking in that it schedules the concurrent execution of the multiple computer programs on the same computer system so that each computer program gets a share of the resources of the computer system. In one embodiment of computer system 220, the operating system (OS) is Windows NT, which is an operating system produced by Microsoft Corporation of Redmond, Washington. Windows NT is a multi-tasking operating system that includes support for customized device drivers. A device driver is computer software that is loaded into the computer system to provide special handling of a particular device or class of devices on the computer system. Upon the initiation of an interrupt for a particular device or class of devices supported by a device driver, the driver fields the interrupt and performs processing, particular to that device. When the device driver completes the processing of the interrupt, the device driver ends execution. During the execution of the device driver, the computer system may be configured such that other pending interrupts from other devices are ignored and not processed until the processing of the device driver completes. In this manner the computer system is dedicated to the processing of the device driver.

While computer system 220 utilizes Windows NT as the preferred operating system, other operating systems such as UNIX, AIX, SOLARIS, or LINUX can be used to practice the invention. The present invention is not specific to a particular operating system, and thus is not so limited.

Computer system 220 executes computer programs under the control of the operating system. These computer programs support applications such as word processing, spreadsheet program or a payroll application. In the preferred embodiment of the invention, computer system 220 includes computer program for monitoring and controlling a servomechanism according to the present invention. The computer program for monitoring and controlling a servomechanism is preferably written in the C or C++ programming language, compiled and linked into executable instructions for execution on CPU 330. The executable instructions resulting from the compilation and linking process are stored in non-volatile memory 340 for long term storage.

Computer system 220 includes a local controller 360 that communicates with CPU 330, RAM 335, and non-volatile memory 340 over communication bus 345. In the preferred embodiment, local controller 360 is a printed circuit board (PCB) that plugs into a slot of computer system 220 for communicating over communication bus 345 to the other components of computer system 220.

Figure 4:
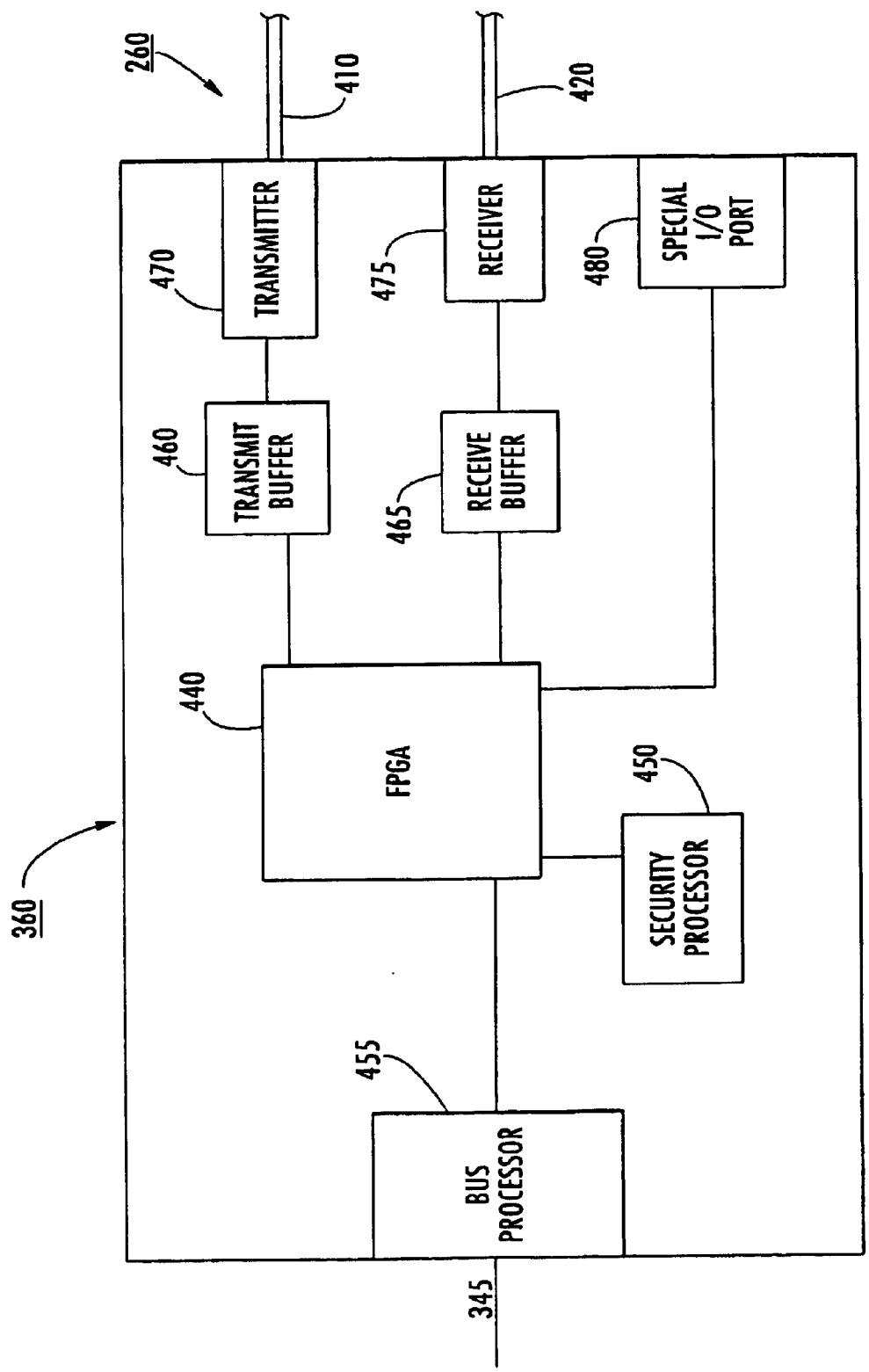
FIG. 4 is a schematic drawing of a local controller according to one embodiment of the present invention.

Referring now to FIG. 4, local controller 360 includes two optical communication ports 410 and 420 that permit communication with remote controller 250. Communication port 410 is used for sending data to remote controller 250 from local controller 360, and communication port 420 is used for receiving data from remote controller 250 at local controller 360. While in the preferred embodiment, ports 410 and 420 interface to an optical communications medium such as fiber optic cable, the present invention is not limited to optical communication but rather to any communication media appropriate for reliable transmission of data between local controller 360 and remote controller 250. For example, other media such as twisted pair wiring and coaxial cable are contemplated to be within the scope of the invention. Similarly, local controller 360 is described as having two communication ports 410 and 420 for communication between local controller 360 and remote controller 250, but one of ordinary skill in the art will recognize that a single communication port for bi-directional communication can be used to practice the invention. As was previously noted, local controller 360 communicates with CPU 330 and RAM 335 over communication bus 345, and thus data may be transferred between CPU 335 and local controller 360. Local controller 360 includes a bus interface 430 for transferring data to and from communication bus 345. To communicate with the other components of computer system 220 local controller notifies communication bus 345 that data is to be transferred from over the bus. Typically, this notification is accomplished by local controller 360 raising an interrupt and putting the data to be transferred on the computer bus 345. Conversely, communication bus 345 notifies local controller 360 of data for transfer to local controller 360 from the components of computer system 220 by putting data on the computer bus 345 and conversing in counterpart to the local controller 345. The details of the communication between CPU 330 and local controller 360 are specific to the particular communication bus 345 that is implemented by computer system 220, but such details are well known to those of ordinary skill in the computer art. In one embodiment of the invention, computer system 220 includes a bus master for allocating the use of computer system 220.

Local controller 360 further includes a Field Programmable Gate Array 440 (FPGA) for customizing the logic operations performed by local controller 360. FPGA 440 is a microchip having a large number of logic gates for implementing Boolean logic and can be dynamically customized by reconfiguring the logic gates of the device. The reconfiguration of the FPGA 440 is accomplished by loading a new logic circuit design into the device. Because the logic of FPGA 440 can be dynamically altered, the characteristics or profile of the local controller 360 can be easily modified to support synchronous AC motors having different characterizations. While the preferred embodiment of the invention uses a FPGA to implement the logic in local controller 360, one of ordinary skill in the art will recognize that other logic devices such as Read Only Memory (ROM) or Erasable Programmable Read Only Memory (EPROM) could be used to implement this intelligence. However, in doing so, local controller 360 would not be capable of being dynamically loaded and the ability to effectively support different synchronous AC motors would be lost. In the preferred embodiment of the invention, FPGA 440 is selected from a family of Field Programmable Gate Arrays manufactured by Xilinx as the XCS10, XCS20, XCS30, and XCS40.

Local controller 360 also includes a bus processor 455 for communicating with communications bus 345. FPGA 440 is loaded from communications bus 345 with logic stored in the non-volatile memory 340 of the computer system 220.

Local controller 360 further includes a security processor 450 for determining the authenticity of the instructions implemented in the FPGA 440. When the local controller 360 is powered up, the security processor presents a specific code to FPGA 440 for authentication by the FPGA 440. If the required code is not presented, local controller 360 is disabled.

Local controller 360 further includes a special I/O port 480 for receiving a special input signal for processing by the local controller. This special input signal may be an emergency signal such as an "emergency stop" command. In the case of an AC motor, an "emergency stop" would immediately brake the rotation of the motor. While an "emergency stop command" is but one example of a special input signal, special I/O port 480 can be utilized to recognize other particular external events. Since the FPGA 440 of local controller 360 is dynamically alterable, support in response to a given signal can be programmed into the FPGA.

Figure 5:
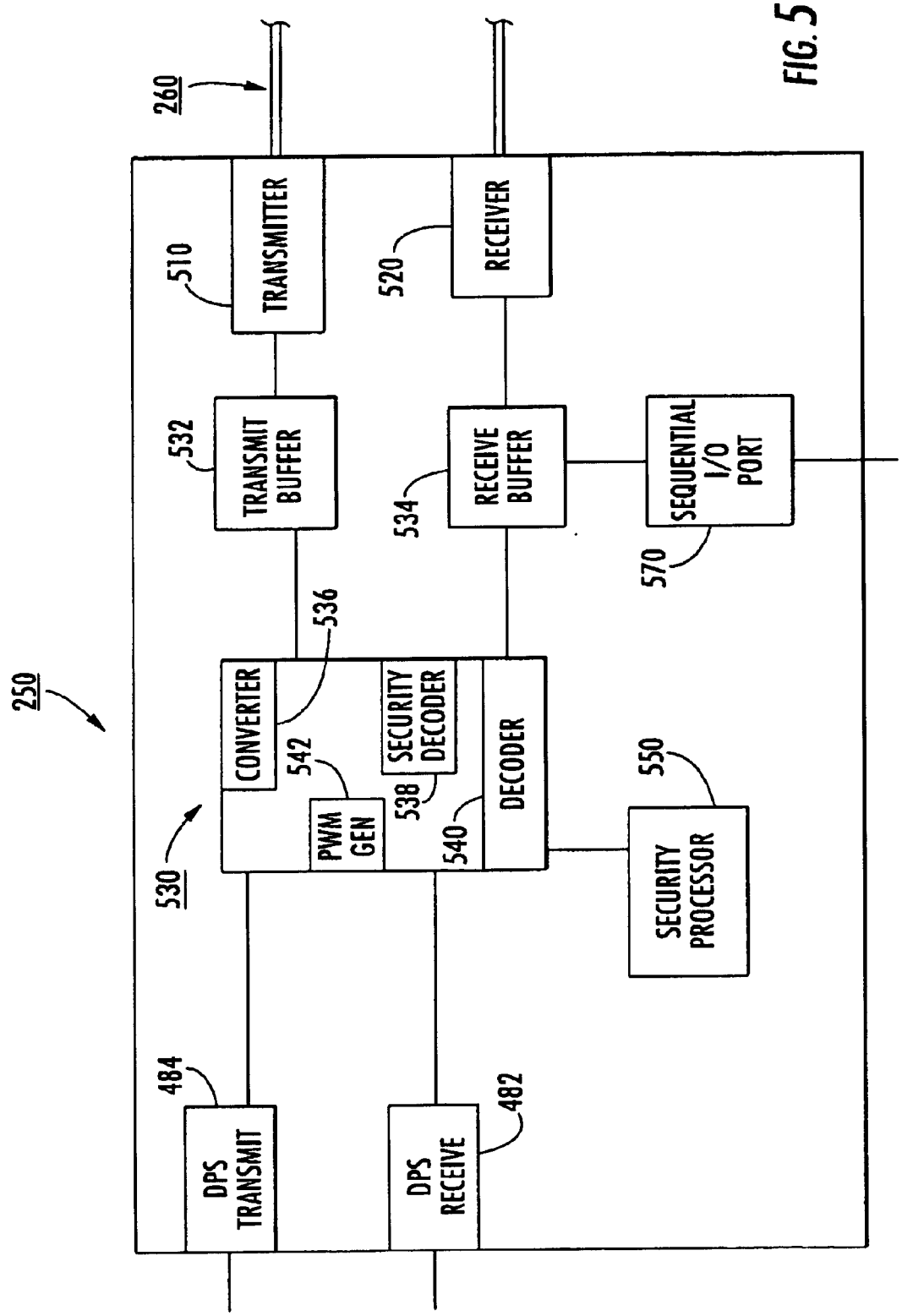
FIG. 5 is a schematic drawing of a remote controller according to one embodiment of the present invention.

Local controller 360 communicates with remote controller 250 via communications link 260. Local controller 360 sends data to remote controller 250 via transmit buffer 460 and transmitter 470 and receives data from remote controller 250 via receive buffer 465 and receiver 475. Local controller 360 receives feedback from remote controller 250 regarding the operation of the remote AC synchronous motor 310, and transfers a response which is generated by computer system 220 to the remote controller for controlling the operation of the AC motor. Remote controller 250 will now be described in more detail with reference to FIG. 5.

Remote controller 250 includes a transmitter 510 for interfacing to a fiber optic cable to send data to local controller 360 and a receiver 520 for interfacing to a second fiber optic cable to receive data from local controller 360. As was pointed out previously, one of ordinary skill in the art will recognize that a single transceiver, permitting bi-directional communication, could be used to practice the invention. In that case, of course, only one fiber optic cable is required for communication with local controller 360.

Remote controller 250 further includes a Field Programmable Gate Array 530 (FPGA) for executing customized logic to control the synchronous AC motor 310. Remote controller 250 includes a receive buffer 534 for receiving and storing data received from receiver 520 and a transmit buffer 532 for storing data prior to transmission to local controller 360 by transmitter 510. The instructions executed at FPGA 530 are said to be customized in that FPGA 530 is dynamically alterable and can be configured according to the type of synchronous AC motor or motors that are being controlled. FPGA 530 is loaded with the customized logic via receiver 520 from local controller 360 upon startup of the CNC 200.

Remote controller 250 is coupled to DPS 270 for receiving feedback regarding the operation of the synchronous AC motor 310. Feedback is received at a remote controller 250 by a DPS receiver circuit 482. A signal indicative of the current delivered to synchronous AC motor 310 is received from the DPS 270 for each motor monitored by DPS 270. The signal is an analog signal and is converted to a digital signal FPGA 530 using an on board Analog-to-Digital converter 536. In an alternative embodiment, DPS 270 includes an on-board Analog-to-Digital converter, and the signal presented to FPGA 530 is a digital signal. The digitized values indicative of the motor drive current are transmitted via transmit buffer 532 and transmitter 510 to local controller 360 of computer system 220 for processing. DPS 270 also monitors each motor for fault conditions, such as a jam of the motor or excess motor current. Remote controller 250 monitors DPS 270 for fault indications and reports any instances to local controller 360 of computer system 220 via transmit buffer 532 and transmitter 510. In order to verify the authenticity of DPS 270, FPGA 530 requires DPS 270 to present a security code to be verified by security decoder 538. With verification, compatibility is assured between the remote controller 250 and DPS 270. If a proper security code is not transmitted by DPS 270, remote controller 250 ceases communication with DPS 270.

Remote controller 250 interfaces directly to each synchronous AC motor 310 through an encoder port for determining an indication of the shaft position of the motor. The indicated shaft position is decoded and digitized by a decoder 540 which is incorporated in FPGA 530 and the decoded value transmitted to local controller 360 of computer system 220 via transmit buffer 532 and transmitter 510 for processing by computer system 220.

Remote controller 250 sends an individual Pulse Width Modulated (PWM) signal to DPS 270 to specify the drive current that is to be delivered to DPS 270 for each motor supported by DPS 270. Remote controller 250 transfers data to DPS 270 by a DPS transmit circuit 484. The drive current for each motor is determined by computer system 220 in response to the previously reported feedback from DPS 270. An indication of the response to drive current is transmitted from computer system 220 to remote controller 250 and received via receive buffer 534 and receiver 520. A PWM generator 542 is incorporated in the FPGA 530 for generating a PWM representation of the specified drive current, and transmitted to DPS 270.

Remote controller 250 further includes a security processor 550 for determining the authenticity of the instructions implemented in the FPGA 530. Upon initialization, the security processor 550 presents a specific code to FPGA 530 for authentication. If the required code is not presented, remote controller 250 is disabled.

FPGA 530 includes a plurality of sequential I/O ports, shown for simplicity as sequential I/O port 570, that is coupled to receive buffer 534 for delivering an analog signal to optional motor accessories. The sequential I/O port 570 allows the CNC 200 to monitor the operation of variables such as switch positions, temperature, noise, cooling, and the like for the machine for which the motor is a component. The digital representation of the analog signal is received from computer system 220 via receiver 520 and transmitted via receive buffer 534 to the sequential I/O port 570.

As previously disclosed, CNC 200 advantageously employs a general purpose computer system 220 for processing the operational feedback from synchronous AC motor 310 and calculating a response to this feedback. The response is delivered via remote controller 250 to DPS 270 for implementing any necessary motor adjustments. It is particularly advantageous since motor control can be realized using computer software rather than specialized hardware. Because the computer software can be easily changed, CNC 200 offers greater flexibility than motor controllers using specialized hardware. This flexibility includes the ability to support the control of a larger number of motors, and even support other types of servomechanisms. As was previously described, computer system 220 may run multiple application computer programs concurrently under control of an operating system. According to the invention, one of the application computer programs that runs on computer system 220 is SERVOPROGRAM, a computer program for controlling the operation of a motor 310. The details of SERVOPROGRAM will now be described.

Figure 6:
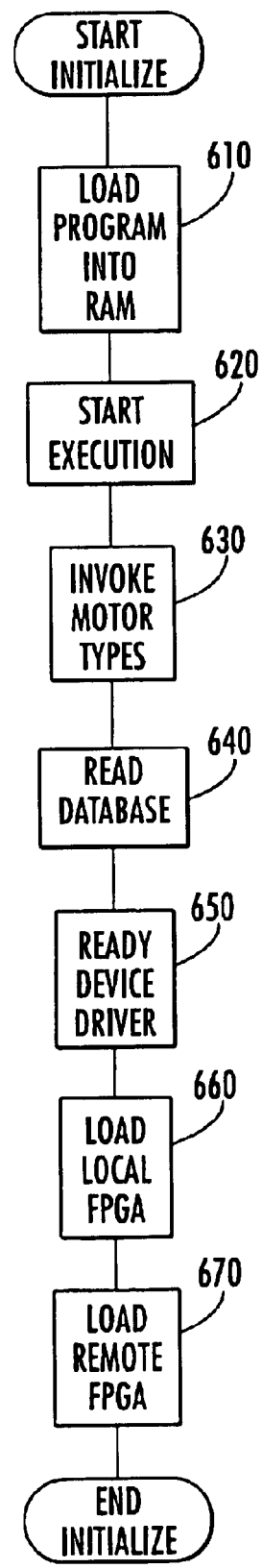
FIG. 6 is a schematic drawing of flow chart of the initiation sequence of the SERVOPROGRAM, according to one embodiment of the present invention.

SERVOPROGRAM is preferably written in the C or C++ programming language, compiled and linked to form an executable computer program. SERVOPROGRAM is typically stored in some form of non-volatile memory, which may be a hard disk, a floppy disk, CDROM or the like. SERVOPROGRAM starts execution when a user of computer system 220 invokes or runs the program. FIG. 6 shows a depiction in flow chart form of the initial processing steps for the SERVOPROGRAM.

As shown in step 610, SERVOPROGRAM is loaded into the RAM 335 of computer system 220. After the start of execution in step 620, SERVOPROGRAM in step 630 invokes from the system user the type or types of motors to be controlled, and in step 640 reads from a database the specifications for the selected motors. SERVOPROGRAM also reads from the same database or an alternative database the M-code, G-code, and S-codes for the application for which the motor is being controlled. The M-code, G-code, and S-code are specific instructions, usually specified by the user of the system, for proper operation of the application task. These instructions conform to an industry standard format and are interpreted by the SERVOPROGRAM to generate the SERVOPROGRAM's response to the received feedback from motor operation. SERVOPROGRAM incorporates device driver software, SERVODEVICE that is readied in step 650 to analyze the feedback from the motor and provide a response to that feedback. SERVODEVICE serves the interrupts generated by FPGA 440 of the local controller 360 for, and allows transmission to and from CPU 335 to FPGA 440.

Having determined the type of motor or motors that SERVOPROGRAM is to control, SERVOPROGRAM in step 660 loads FPGA 440 of local controller 360 with the instructions for communicating with SERVOPROGRAM and also remote controller 250. SERVOPROGRAM in step 670 transmits to FPGA 440 of local controller 360 the appropriate instructions for loading FPGA 530 of remote controller 250 with the appropriate instructions to control the types of motors selected by the user.

At this stage in the processing of the SERVOPROGRAM, the SERVOPROGRAM program is loaded and both FPGAs are initialized by SERVOPROGRAM to monitor and control the motor's operation. The processing of SERVOPROGRAM during the operation of the motor will now be described with reference to FIG. 7.

As has been previously discussed, CNC 200 provides a flexible architecture for controlling a generic servomechanism. However, for purposes of disclosure, the operation of CNC 200 will now be described with reference to controlling one or more electric motors, such as the synchronous AC motor 310, as part of a specific application process. Examples of such an application process might be a tool cutting process, but certainly any other process requiring the control of an electric motor is contemplated to be within the scope of the invention. The objective of the CNC 200 system is to provide a sinusoidal current to the synchronous AC motor 310, consistent with the specific application process. This sinusoidal signal is represented by a PWM digital signal. Using a tool cutting application as an example, motor operation will vary according to the hardness and density of the material to be cut. Furthermore, it is likely that the rate of cutting of the material be constant so as not to rip the material. In order to attain the application objective, the CNC 200 system receives feedback regarding motor operation and develops a response so as to maintain operation of the motor consistent with the application process. Again, the description is in no way intended to limit the scope of the invention to merely controlling an electric motor, but rather a motor application is used to frame the description of the invention with reference to a particular servomechanism.

Figure 7:
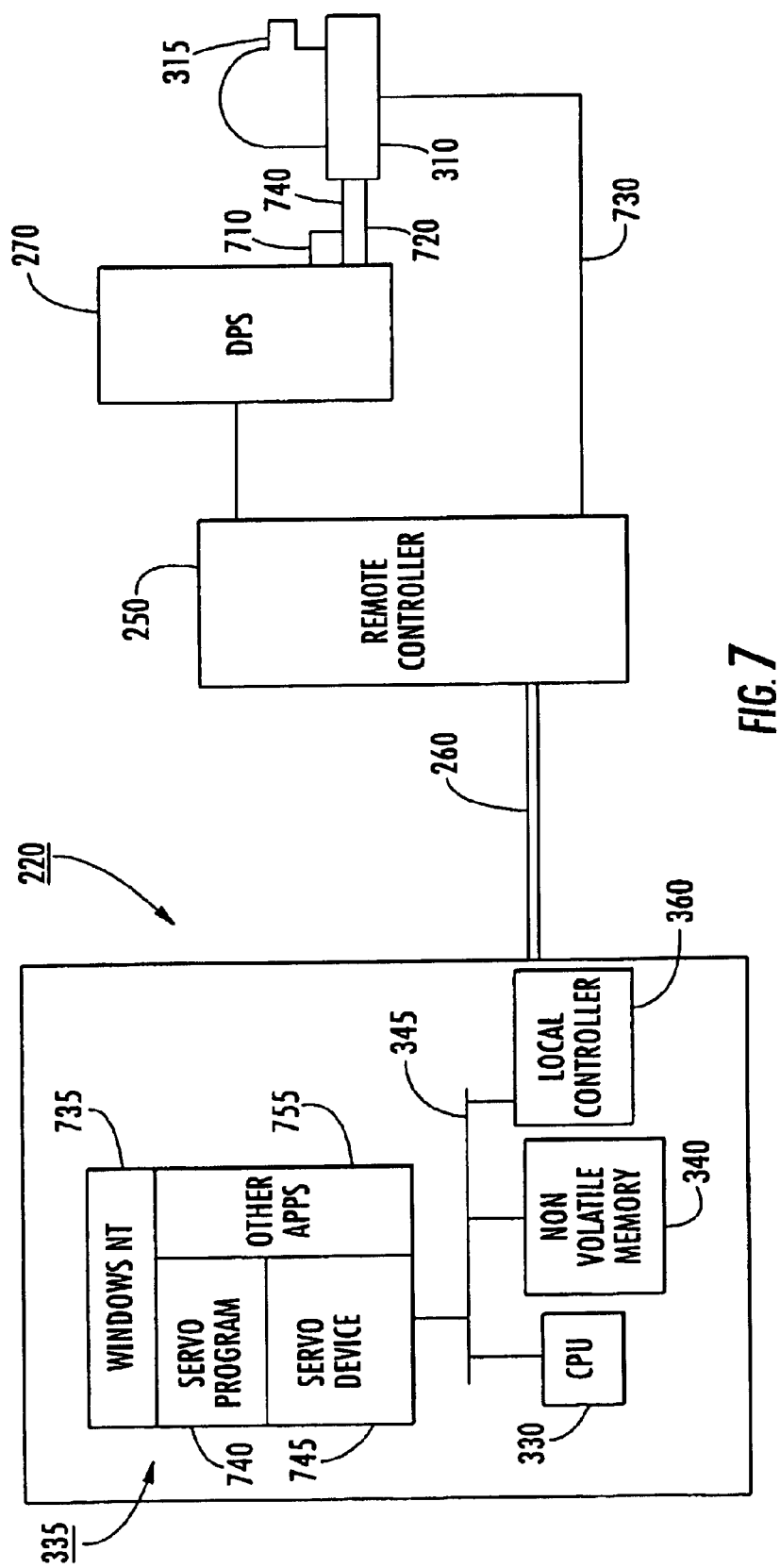
FIG. 7 is a schematic drawing of a computerized numerical control system for controlling a servomechanism according to one embodiment of the present invention showing the SERVOPROGRAM and SERVODEVICE software.

Referring to FIG. 7, there is shown a schematic drawing of CNC 200 for controlling a synchronous AC motor 310, according to a specific application process. While only one synchronous AC motor 310 is shown in FIG. 7, the present invention is not limited to controlling only a single motor, but can be applied to the concurrent control of multiple motors. In the following description, the operation of only one motor is discussed in order to avoid unnecessary redundancy. Providing a sinusoidal three-phase current to the motor drives the synchronous AC motor 310. The combination of the frequency and the magnitude of the current determines the rotation of the draft 315 of the motor, and the magnitude of the current determines the torque of the 315 of the motor. Therefor by varying these parameters the motor can be controlled.

DPS 270 provides an interface to synchronous AC motor 310 for receiving feedback in feedback loop 710 regarding to operation of the synchronous AC motor 310. Specifically, DPS 270 receives feedback signal of the three-phase AC current transmitted to the motor 310 by DPS 270. The current delivered to the motor is sampled at a predetermined time interval, which in one embodiment of the invention the time interval is 100 μsec. However, one of ordinary skill in the art will recognize that other time intervals may be used, depending on the application. An encoder input 270 from the synchronous AC motor 310 also provides to DPS 270 the position of the motor's shaft. DPS 270 further provides an input port 320, see FIG. 3, for interfacing an external device to DPS 270 to manually control the operation of the motor by external means. DPS 270 samples the analog three-phase current at periodic intervals, and sends the results to remote controller 250.

Remote controller 250 receives the sampled current feedback from DPS 270 and converts the analog signal to a digital signal by performing an Analog to Digital conversion of the signal. Remote controller 250 also senses directly the shaft position of the motor on encoder lead 730. The value of the current and the digital representation shaft position of the motor are processed by FPGA 530, FIG. 5, and transmitted to local controller 360 via the communication link 260 for analysis at the computer system 220.

Upon receiving the motor current data and the shaft position form remote controller 250, the local controller 360 generates an interrupt at the request of the remote controller 250 to transfer the data across the communication bus 345 for processing by CPU 330, specifically by the execution of a device driver, the SERVODEVICE software 745. Alternatively, the local controller may generate an interrupt request at its own initiative.

The SERVODEVICE software is loaded into RAM 335 of computer system 220 and handles the interrupts generated by the local controller 360 and accepts the motor current data and shaft position data over communication bus 345 for processing. Using a well-known bus mastering technique for the Windows NT 735, the SERVODEVICE software takes control of the CPU 330, and does not relinquish control to other application tasks 755 in the system until the SERVODEVICE software has completed. Consequently, the SERVODEVICE software has exclusive control of the communication bus 345 of computer system 220, and is not interrupted by other operations such as a file transfer from disk or CDROM into memory or pending interrupts from other devices. Furthermore, the SERVODEVICE device driver software is given a very high priority so as not to be interrupted by Windows NT giving a time slice of CPU 330 to other application tasks 755. Because the SERVODEVICE software is not interrupted, the software can complete analyzing and responding to the received motor data in a nearly uniform interval of time without interference or delay from other tasks executing concurrently in the computer system 220.

The SERVODEVICE software receives the motor data including the motor current data and the position data for the shaft and calculates a new current to be delivered to the motor and the commutation needed for driving the synchronous AC motor 310. The new current is expressed in a Pulse Width Modulation (PWM) format. The current to be delivered to the synchronous motor 310 represents a sinusoidal current, and thus the SERVODEVICE software calculates a change to the reported current value that will maintain this sinusoidal current. In performing these calculations, the SERVODEVICE software executes on the CPU 330 of computer system 220 and implements a "Proportional Integration Differentiation" controller, known as a PID controller for determining the response to the current feedback to maintain the sinusoidal current. The general expressions or algorithm for implementing a PID controller are well-known to those of ordinary skill in the art, and are conventional. PID controllers are described in *Modern Control Engineering* by Katsuhiko Ogata, $2^{nd}$ edition, Prentice Hall, 1990, ISBN 0-13-589128-0. In implementing a PID controller, three coefficients are defined that correspond to the proportionality factor, the integration factor, and the differentiation factor of the PID control algorithm.

In conventional Computer Numerical Control systems, using a PID control algorithm, these three coefficients are fixed and constant for all applications because the algorithm is implemented in hardware such as a custom ASIC device which can not be changed or modified for different motors and applications. For example, if a new motor is used for a tool cutting operation, the values of the three coefficients remain fixed, and cannot change or be adapted to the characteristics of the new motor. Therefor the coefficient values can not be optimized to conform to the different motors, and some degree of difference is introduced into the PID calculations due to the inaccurate model.

The present invention avoids these inaccuracies since the SERVODEVICE program implements the PID control algorithm in software, and thus the values of the coefficients can be easily modified. The SERVODEVICE program, knowing the specifics of the synchronous AC motor that is being driven can change the three coefficient values to conform to the particular model of motor. Furthermore, the values of the coefficients can be modified dynamically while the synchronous AC motor is running. Thus the coefficients are modifiable in real time to adapt the system to the characteristics of the motor.

Having determined the response motor current appropriate to the current feedback received from the motor, the SERVODEVICE software transfers this response to the local controller 360 over the communication bus 345. As mentioned earlier, the response is coded in a PWM format to accommodate the digital transmission of the data. Local controller 360 accepts the response data over communication bus 345, and transmits the data on communication link 260 to remote controller 250 for delivery by remote controller 250 to DPS 270. DPS 270 converts the PWM signal received from the remote controller 250 into a three-phase current and delivers the current to the windings of the synchronous AC motor 310 over lead 740 to drive the motor. The process continues again in the same fashion in that the current delivered to the synchronous AC motor is feed back on feedback loop 710 to DSP 720 for further reporting to computer system 220

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A computerized numerical control system for controlling a servomechanism, said servomechanism having an operational status, said system comprising:
   a computer system including a central processing unit for executing a control algorithm responsive to specification details of said servomechanism and to generate commands to direct the operation of said servomechanism in response to said operational status of said servomechanism, said commands including a pulse width modulation command; and
   a first controller in communication with said computer system and said servomechanism for receiving said operational status from said servomechanism, forwarding said operational status to said computer system, and receiving said commands generated by said computer system, said operational status including position data and current data, and said control algorithm generating new pulse width modulation commands in response to said position and current data.

2. The computerized numerical control system of claim 1 wherein said first controller includes a transmitter and receiver for interfacing to a communication channel to send said operational status and receive said commands.

3. The computerized numerical control system of claim 2 further including:
   a second controller coupled to said computer system for receiving said commands from said computer system and transmitting said commands from said computer system to said first controller.

4. The computerized numerical control system of claim 3 wherein said second controller includes a transmitter and receiver.

5. The computerized numerical control system of claim 3 wherein said second controller is coupled to said computer system by a computer bus.

6. The computerized numerical control system of claim 5 wherein said computer bus is an ISA bus.

7. The computerized numerical control system of claim 3 wherein said second controller further includes a storage element for storing a second executable logic to receive said commands from said computer system and transmit said commands from said computer system to said first controller.

8. The computerized numerical control system of claim 7 wherein said second controller includes means for receiving said second executable logic from said computer system.

9. The computerized numerical control system of claim 7 wherein said computer system further includes means for transmitting said second executable logic to said second controller means.

10. The computerized numerical control system of claim 3 wherein said second controller further includes means for directly receiving an external signal indicating a predetermined action to be performed by said servomechanism.

11. The computerized numerical control system of claim 2 wherein said communication channel is an optical channel.

12. The computerized numerical control system of claim 11 wherein said communication channel is comprised of at least one optical fiber.

13. The computerized numerical control system of claim 1 wherein said servomechanism is an electric motor housing a rotating shaft therein.

14. The computerized numerical control system of claim 13 wherein said operational status includes a feedback from said motor selected from feedback indicating the position of the shaft of said motor, feedback indicating the torque of said motor, and feedback indicating the velocity of said rotating shaft of said motor.

15. The computerized numerical control system of claim 14 wherein said commands generated by said control algorithm include a response to said feedback from said motor for initiating a change in the operation of the motor.

16. The computerized numerical control system of claim 15 wherein said response to said feedback from said motor is derived using a Proportional-Integration-Differentiation (PID) control algorithm in said computer system.

17. The computerized numerical control system of claim 16 wherein said PID control algorithm is composed of three factor expressions, each factor expression having a separate control coefficient, each of said control coefficients being particular to said motor.

18. The computerized numerical control system of claim 1 wherein said first controller further includes means for delivering said Pulse Width Modulation (PWM) command to said servomechanism.

19. The computerized numerical control system of claim 18 wherein said first controller further includes means for receiving and decoding encoder signals of said servomechanism.

20. The computerized numerical control system of claim 1 further including:
   a database for storing the specification details of said servomechanism and instructions for the operation of said servomechanism.

21. The computerized numerical control system of claim 20 wherein said controller includes a Field Programmable Gate Array (FPGA).

22. The computerized numerical control system of claim 20 wherein said instructions for the operation of said servomechanism are M-code instructions.

23. The computerized numerical control system of claim 20 wherein said instructions for the operation of said servomechanism are G-code instructions.

24. The computerized numerical control system of claim 20 wherein said controller includes executable logic responsive to said stored specification details of said servomechanism.

25. A computerized numerical control system for controlling a servomechanism, said servomechanism having an operational status, said system comprising:

a central processing unit for executing a computer program including a Proportional-Integration-Differentiation control algorithm with dynamically changeable control coefficients to generate a changeable pulse width modulation command to direct the operation of said servomechanism in response to said operational status of said servomechanism; and a first controller in communication with said central processing unit and said servomechanism for receiving said operational status from said servomechanism, forwarding said operational status to said processing unit, and receiving said command generated by said processing unit.

26. A computerized numerical control system for controlling a servomechanism, said servomechanism having an operational status, said system comprising:

a computer system including a central processing unit for: executing a program, said program invoking from the system user the type of servomechanism to be controlled, reading from a database specifications for and information regarding applications of said servomechanism, receiving feedback from said servomechanism, and providing a response to said feedback in real time.

27. The computerized numerical control system for controlling a servomechanism of claim 26 further comprising a local controller for loading a remote controller with instructions to control said servomechanism, said local controller having been provided with said instructions by said program.

28. The computerized numerical control system for controlling a servomechanism of claim 27 wherein said response is a sinusoidal current signal.

29. The computerized numerical control system for controlling a servomechanism of claim 27 wherein said response is represented by a pulse width modulated signal.

30. The computerized numerical control system for controlling a servomechanism of claim 29 wherein an algorithm in said software program for implementing said Proportional-Integration-Differentiation controller contains three coefficients corresponding to a proportionality factor, an integration factor, and a differentiation factor, said coefficients being variable over time.

31. The computerized numerical control system for controlling a servomechanism of claim 26 further comprising a software program for executing on said central processing unit and for implementing a Proportional-Integration-Differentiation controller.

32. A computerized numerical control system for controlling a servomechanism, said servomechanism having an operational status, said system comprising:

a computer system including a central processing unit for executing a control algorithm to generate commands to direct the operation of said servomechanism in response to said operational status of said servomechanism wherein said servomechanism is an electric motor housing a rotating shaft therein and wherein said operational status includes a feedback from said motor selected from feedback indicating the position of the shaft of said motor, feedback indicating the torque of said motor, and feedback indicating the velocity of said rotating shaft of said motor, said commands generated by said control algorithm including a response to said feedback from said motor for initiating a change in the operation of the motor and including a pulse width modulation command;

a first controller in communication with said computer system and said servomechanism for receiving said operational status from said servomechanism, forwarding said operational status to said computer system, and receiving said commands generated by said computer system, said operational status including position data and current data, and said control algorithm generating new pulse width modulation commands in response to said position and current data; and wherein said response to said feedback from said motor is derived using a Proportional-Integration-Differentiation (PID) control algorithm in said computer system composed of three factor expressions, each factor expression having a separate control coefficient, each of said control coefficients being particular to said motor.

33. A computerized numerical control system for controlling a servomechanism, said servomechanism having an operational status, said system comprising:

a computer system including a central processing unit for: executing a program, said program invoking from the system user the type of servomechanism to be controlled, reading from a database specifications for and information regarding applications of said servomechanism, receiving feedback from said servomechanism, and providing a response to said feedback in real time; and a local controller for loading a remote controller with instructions to control said servomechanism, said local controller having been provided with said instructions by said program.

34. The computerized numerical control system for controlling a servomechanism of claim 33 wherein said response is a sinusoidal current signal.

35. The computerized numerical control system for controlling a servomechanism of claim 33 wherein said response is represented by a pulse width modulated signal.

36. The computerized numerical control system for controlling a servomechanism of claim 33 further comprising a software program for executing on said central processing unit and for implementing a Proportional-Integration-Differentiation controller.

37. The computerized numerical control system for controlling a servomechanism of claim 36 wherein an algorithm in said software program for implementing said Proportional-Integration-Differentiation controller contains three coefficients corresponding to a proportionality factor, an integration factor, and a differentiation factor, said coefficients being variable over time.

* * * * *